United States Patent [19]

Glaze

[11] 4,065,154
[45] Dec. 27, 1977

[54] VEHICLE SUSPENSION SYSTEMS

[75] Inventor: Stanley George Glaze, Brierley Hill, England

[73] Assignee: Lucas Industries Limited, Birmingham, England

[21] Appl. No.: 693,179

[22] Filed: June 7, 1976

[30] Foreign Application Priority Data

June 7, 1975 United Kingdom ............... 24595/75

[51] Int. Cl.² ............................................. B60G 9/00
[52] U.S. Cl. ..................................................... 280/707
[58] Field of Search ...................... 280/707, 709, 714; 267/65 D

[56] References Cited

U.S. PATENT DOCUMENTS 3,003,783   10/1961   Bryeder ................................ 280/707
3,603,612   9/1971    Hill ...................................... 280/707

Primary Examiner—Philip Goodman

[57] ABSTRACT

A vehicle suspension system has a hydro-pneumatic suspension unit for each wheel, transducers for sensing the pressures in the respective suspension units, transducers for sensing the velocities, relative to the vehicle body, of the respective wheel axes, damping control valves for the respective suspension units and control means, responsive to signals from the pressure and velocity transducers, for varying the damping effects of the control valves.

5 Claims, 3 Drawing Figures

VEHICLE SUSPENSION SYSTEMS

This invention relates to vehicle suspension systems and has as an object to provide a suspension system in a convenient form.

A vehicle suspension system in accordance with the invention comprises a plurality of hydraulic suspension units for respective wheels of the vehicle, electro-hydraulic transducer means associated with each hydraulic suspension unit and producing an electrical output corresponding to the hydraulic pressure in the associated suspension unit, a plurality of wheel velocity transducers associated respectively with the suspension units and each producing an electrical signal corresponding to the velocity of movement of the associated wheel axis relative to the vehicle body, a plurality of damping control valves associated respectively with the respective suspension units and control means for the damping control valves, said control means having inputs from the pressure transducers and the velocity transducers and providing outputs to vary the damping effect of each damping valve so as to establish a desired functional inter-relationship between the pressure and velocity signals.

Figure 1:
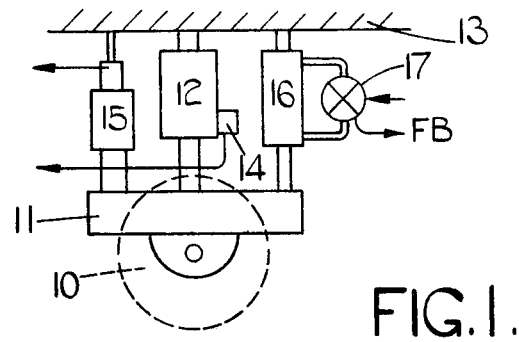
Figure 2:
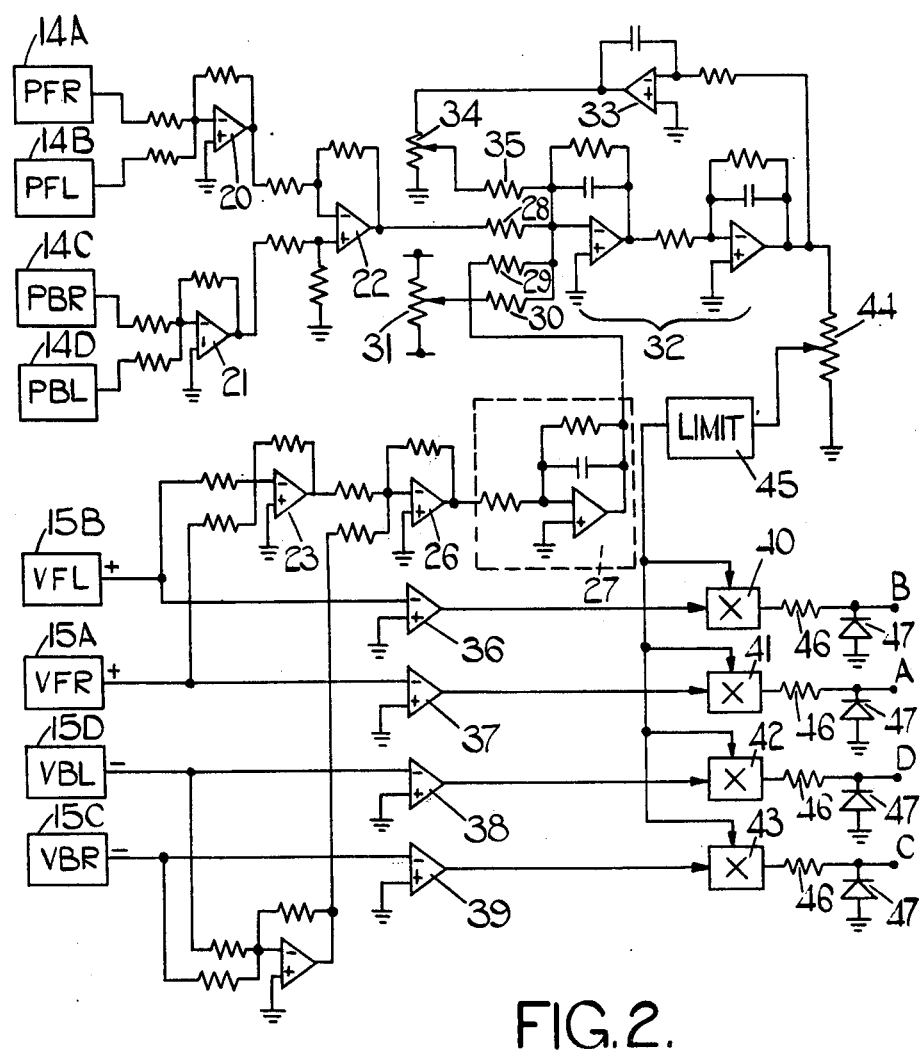
Figure 3:
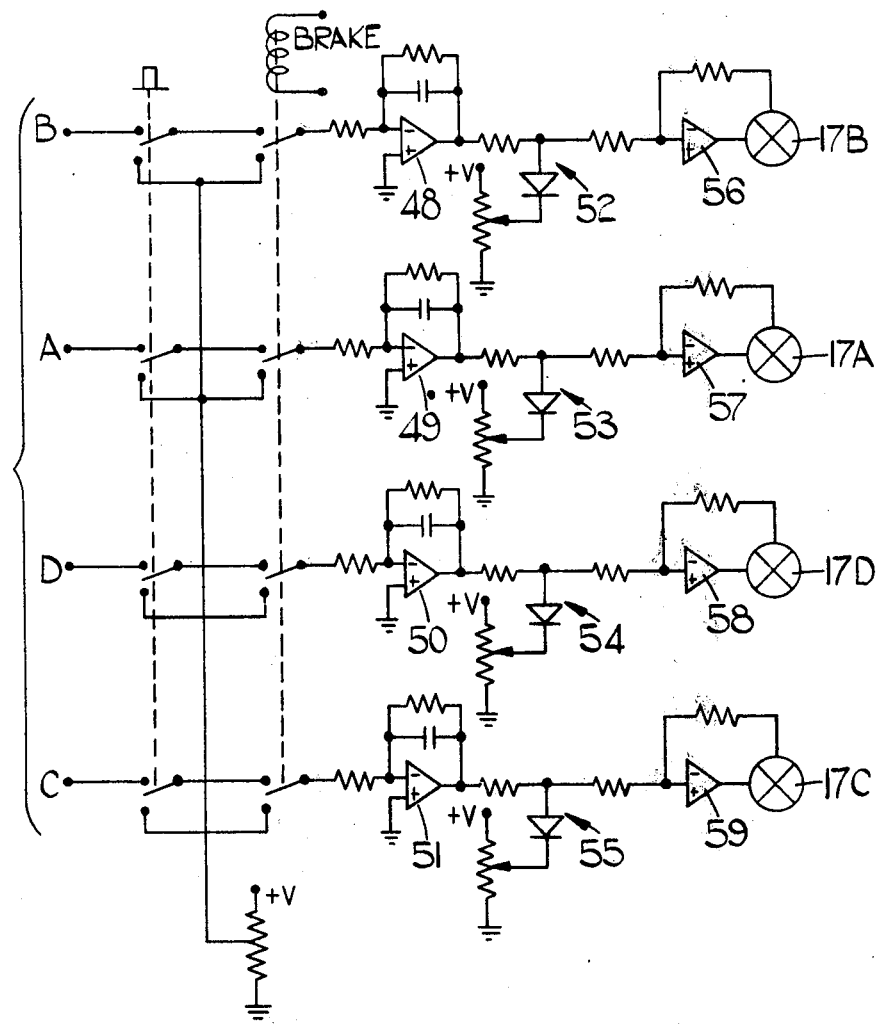

An example of the invention is illustrated in the accompanying drawings in which FIG. 1 is a diagrammatic representation of the suspension arrangements for one wheel of a vehicle and FIGS. 2 and 3 are schematic circuit diagrams for the control of four such suspension arrangements intended to control pitching motion of the vehicle.

Referring firstly to FIG. 1 each wheel 10 has a carrier 11 which is supported by a hydro-pheumatic suspension unit 12 on the vehicle body 13. An electro-hydraulic transducer 14 senses the pressure in the unit 12 and provides an electrical output signal. The suspension may also include a linkage of some sort but since this is purely passive it is not shown in FIG. 1. A velocity transducer 15 is mounted between the carrier 11 and the body 13 and produces an electrical output varying with the velocity of the carrier 11 relative to the body 13. A damper unit 16 is also mounted between the carrier 11 and the body 13 and is controlled by an electro-hydraulic servo valve 17. The damper/valve may be as described in our U.K. Patent Application No. 35934/74.

Turning now to FIG. 2 the four pressure transducers 14A, 14B, 14C, and 14D of the front right, front left, back right and back left wheels respectively have their outputs combined in a circuit utilising a pair of summing amplifiers 20, 21 for the front wheel transducers and the rear wheel transducers respectively and a difference amplifier 22 as shown. The two front wheel velocity transducers 15A, 15B have their outputs combined by a summing amplifier 23 and the back wheel velocity transducers 15C, 15D have their output signals combined by a summing amplifier 24. The back velocity transducers produce a signal of opposite polarity to the front velocity transducers for movement in a given direction so that the outputs of the amplifiers 23, 24 can be combined in a summing amplifier 26 to give an output corresponding to the velocity difference which is related to the pitch angular velocity of the body relative to the wheel carriers. It will be noted that pure bouncing movement of the body without any pitching thereof will not produce any output signal from the amplifier 26.

The amplifier 26 has its output applied to a signal generating circuit 27 acting to provide an output signal corresponding to the desired value of the output of the amplifier 22 for the existing velocity transducer outputs.

The signals from the amplifier 22 and the circuit 27 are applied to a summing network including resistors 28, 29. A further resistor 30 in this network connects in the variable point of a potentiometer 31, the ends of the potentiometer being connected to positive and negative reference voltage sources. A two stage active low pass filter network 32 is connected to the mixing point of the mixing network so as to filter out high frequency components and also add a further delay to step changes in the input. The output of the filter network is connected to the input terminal of an integrator 33 providing an output signal to a potentiometer 34, the variable point of which is conntected into the mixing network via a further resistor 35. The effect of the integrator 33 is to provide a negative feedback signal which increases with time so that, following a change in any input to the mixing network the output of the filter 32 will first rise to a maximum value and then decay back to zero, the decay rate depending on the setting of the potentiometer 34. This has virtually the same effect as a.c. coupling the transducers 14 to the amplifiers 20, 21 and such a.c. coupling may be used as an alternative to the integrating feedback path described above.

The outputs of the velocity transducers 15A to D are also connected to comparator circuits 36, 37, 38, 39 which switch to zero input so as to act as polarity detectors and the outputs of the comparators are applied to four analog 4-quadrant mulfiplier circuits 40, 41, 42 and 43 each of which also has an input from the filter 32 via a potentiometer 44 and a limit circuit 45. The output of each multiplier is applied via a resistor 46 to the cathode of a diode 47 which has its anode grounded so that an output is provided only when the polarity of the signals from the filter 32 and the associated one of the comparator circuits 36 to 39 are the same. The magnitude of the output is proportional to the output of the filter 32.

The signals from the four multipliers are fed to four switch selector circuits (see FIG. 3) which allow manual overriding of the control and which also disconnect the control during braking. Four further active low-pass filter circuits 48, 49, 50 and 51 are connected to add a further delay to the control signals from the multipliers and after these filters final voltage limiting circuits 52, 53, 54, 55 are inserted before amplifiers 56, 57, 58 and 59 which provide servo-control signals for the four valves 17A, 17B, 17C and 17D.

The circuit 27 provides a dynamic model of the required velocity/fluid pressure characteristics of the vehicle suspension. The control circuit effectively sets up an output corresponding to the required pressure difference signal for the existing pitch velocity signal and the remaining filters, multipliers, limiters etc constitute a control circuit which adjusts the damping continuously to ensure that the actual characteristic is matched to the desired characteristic.

I claim:

1. A vehicle suspension system comprising a plurality of hydraulic suspension units for respective wheels of the vehicle, electro-hydraulic transducer means associated with each hydraulic suspension unit and producing an electrical output corresponding to the hydraulic pressure in the associated suspension unit, a plurality of wheel velocity transducers associated respectively with the suspension units and each producing an electrical signal corresponding to the velocity of movement of the associated wheel axis relative to the vehicle body, a plurality of damping control valves associated respectively with the respective suspension units and control means for the damping control valves, said control means having inputs from the pressure transducers and the velocity transducers and providing outputs to vary the damping effect of each damping valve so as to establish a desired functional inter-relationship between the pressure and velocity signals, the control circuit including means for generating an electrical signal dependent on the difference between the average velocity sensed by a pair of the velocity transducers associated with a front pair of wheels of the vehicle, and the average velocity sensed by a further pair of the velocity transducers associated with a rear pair of wheels of the vehicle, a signal generating circuit connected to said signal generating means and producing an electrical output signal corresponding to the desired value of the difference between the front and rear pressure transducer signals, a summing network for combining the signal from the signal generating means with a signal derived from the pressure transducers and means controlled by said summing network for controlling the damping control valves.

2. A vehicle suspension system as claimed in claim 1 in which said signal generating means includes a first summing amplifier for summing the outputs of the front velocity transducers, a second summing amplifier for summing the outputs of the rear velocity transducers, the front and rear transducers respectively producing outputs of opposite polarity for wheel movements in the same direction relative to the vehicle body, and a third summing amplifier summing the output of the first and second summing amplifiers.

3. A vehicle suspension system as claimed in claim 2 further comprising a fourth summing amplifier summing the outputs of the pressure transducers associated with the vehicle front wheels, a fifth summing amplifier summing the outputs of the pressure transducers associated with the vehicle rear wheels, a difference amplifier having inputs connecting to the outputs of the fourth and fifth summing amplifiers and providing an actual valve pressure difference signal to the summing network.

4. A vehicle suspension system as claimed in claim 3 in which the summing network also has an input from an electronic integrator which receives an input from a filter which receives its input from the summing network, the integrator providing delayed negative feedback to the summing network so as to reset the output of the filter to zero after a delay following a change in any of the inputs to the summing network.

5. A vehicle suspension system as claimed in claim 1 in which said means controlled by the summing network comprises a plurality of independent damping control valve control circuits, each comprising a comparator sensitive to the output of an associated one of the velocity transducers and producing a positive or negative going output when the output of the transducer is negative or positive respectively, a four quadrant multiplier circuit with inputs from the associated comparator and from the summing network and a circuit for cancelling the output of the multiplier when its inputs are in two of the four quadrants.

* * * * *